Oct. 25, 1960 W. HERTERICH 2,957,951

DEVICES FOR THE TRANSMISSION OF SERIES OF ELECTRICAL PULSES

Filed Jan. 23, 1956 2 Sheets-Sheet 1

Inventor:
W. Herterich
By Glascock Downing & Seebold
Attys.

Inventor:
W. Herterich
By Glascock Downing & Seebold
Attys.

United States Patent Office 2,957,951
Patented Oct. 25, 1960

2,957,951

DEVICES FOR THE TRANSMISSION OF SERIES OF ELECTRICAL PULSES

Walter Herterich, Etzenhausen, near Dachau, Germany, assignor to Oskar Vierling, Ebermannstadt, Oberfranken, Germany Filed Jan. 23, 1956, Ser. No. 560,838

9 Claims. (Cl. 179—90)

The invention relates to a device, for the transmission of series of electrical pulses, in which the selectable length of the path over which a setting member moves away from and back to an initial position, to which the member is returned by an automatic returning device, determines the number of pulses in the series transmitted.

Devices of this kind have already been employed frequently in telecommunications equipment, particularly on control devices and dialling equipment, wheret he electrical pulses sent out by the device cause control motions to be performed by control instruments receiving the pulses.

In most known devices of this kind the setting member which determines, by the position into which it is moved, the number of individual pulses to be transmitted in each series of pulses, had to be set by hand. The return of the setting member to its initial position is effected in the known instruments mostly by means of an energy-storing device, for instance a spring, which is stressed in the course of the setting motion of the setting member, which motion is effected by hand.

Probably the most widely known device of this kind is the dialling device employed in telephone instrument for automatic working, where the dialling plate accommodated on the outside of the telephone instrument is pulled against a fixed stop by a human finger inserted into one of the holes of the dialling plate, against the force of the spring tending to return the dialling plate to its initial position; after the finger has been removed from the hole of the dialling plate, the stressed spring returns the plate to its initial position. When a person has to operate a selecting device of this kind, the finger operating the dialling plate often becomes fatigued very soon. The compression caused repeatedly at the same point on the finger may sometimes lead even to painful contusions.

It is the purpose of the invention to provide a simple device, for the transmission of series of electrical pulses, which can be operated without fatigue and in which the displacement of the setting member, which hitherto involved the use of manual force, is effected by a separate source of energy, for instance a stressed spring acting as an energy accumulator, which is recharged or stressed as the setting member is returned to its initial position.

In order to carry out the recharging or stressing of the energy accumulator displacing the setting member, it is proposed according to the invention to use a power-driven stepping mechanism, which returns the setting member step by step and actuates at each step a pulse contact controlling the electrical pulses. The stepping mechanism, which is preferably driven and controlled electrically, then recharges the energy accumulator step by step.

In order to ensure that the length of the path over which the setting member is moved by the energy accumulator from its initial position can be chosen as required, a large number of consecutive stops, preferably uniformly spaced, are accommodated along the path of the setting member; for each series of pulses the operator manually actuates one of these stops, which blocks the motion of the setting member away from its initial position, and thus limits the length of the path traversed by said member.

It is found convenient to arrange the energy accumulator to act continuously on the setting member, and to provide a locking member which is released by actuating any one of the stops, and releases the setting member only when any one of the stops has been actuated, so that the setting means can move up to that particular stop.

In order to prevent accidental actuation of one of the stops from interfering with the automatic return motion of the setting member and thereby leading to wrong connections, a blocking means common to all stops is provided, which is adapted to prevent the actuation of any of the stops and to be released by return of the setting member to its initial position.

This blocking means co-operates with a member adapted to be moved by actuation of any one of the stops and to release the locking means.

The stepping mechanism can be designed according to the invention as a ratchet gear actuated by electromagnetic means, comprising a push pawl operated intermittently by an electrically controlled electro-magnet moving a ratchet wheel permanently fixed to the setting member, in one direction by one tooth during each step, and a retaining pawl, which also engages the ratchet wheel and prevents the ratchet wheel and setting member from rotating in the opposite direction.

This ratchet gear can also be employed at the same time to lock the setting member in its initial position, if the member co-operating with the blocking means common to all stops is designed in such a way that it is axially displaceable, after the blocking means has been released by the setting member, and by virtue of its axial displacement releases the ratchet wheel, which is also axially displaceable with respect to the push pawl and the retaining pawl of the stepping mechanism, thus releasing the means locking the setting member in its initial position.

For the employment of the device according to the invention as a selector, similar to the dialling plate of telephone instruments, it is found to be convenient to design the setting member as a lever rotatable about an axis, and to arrange the stops on a circular arc, all at the same distance from the axis of the lever.

The stops can then be push-buttons arranged along a circular arc on a round disc, and provided with pins; the pins project through a plate forming the base plate of the device, and each push-button is forced by a respective spring into its rest position.

The sequence of the various stepping motions of the stepping mechanism, and thus of the pulses which are to be transmitted, can be determined by means of an already known timing device, which may be composed, for instance, of resistances or impedances and rectifiers, and controls the stepping speed of the stepping mechanism.

In order to modify the duration of a pulse and thus also to set the length of the pauses between the pulses, an additional relay is proposed, which is also already known and equipped with a variable attenuator, a rectifier being employed to ensure that the attenuator acts in only one direction.

It is also advisable to connect the device to a special indicating system, which responds so as to indicate for each pulse the fact that the pulse has been transmitted; a particularly simple kind of indicating device of this nature is a suitably connected electrical lamp.

In order to explain the invention in detail, a device for the transmission of series of electrical pulses has been chosen as an example, in which the push-buttons are arranged along a circular arc, like the holes of the known type of dialling disc of an automatic telephone instrument. This embodiment is shown in the drawings, but the invention is not limited to this example.

In order that the invention may be clearly understood and readily carried into effect, the same will now be described more fully with reference to this example illustrated in the accompanying drawings, in which.

Figure 1:
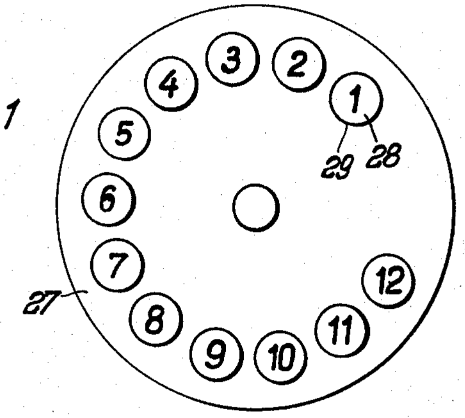
Figure 1 is a front view of the device, showing the push-buttons for the control of the device projecting from a cover plate and arranged along a circular arc.
Figures 2, 3, 4:
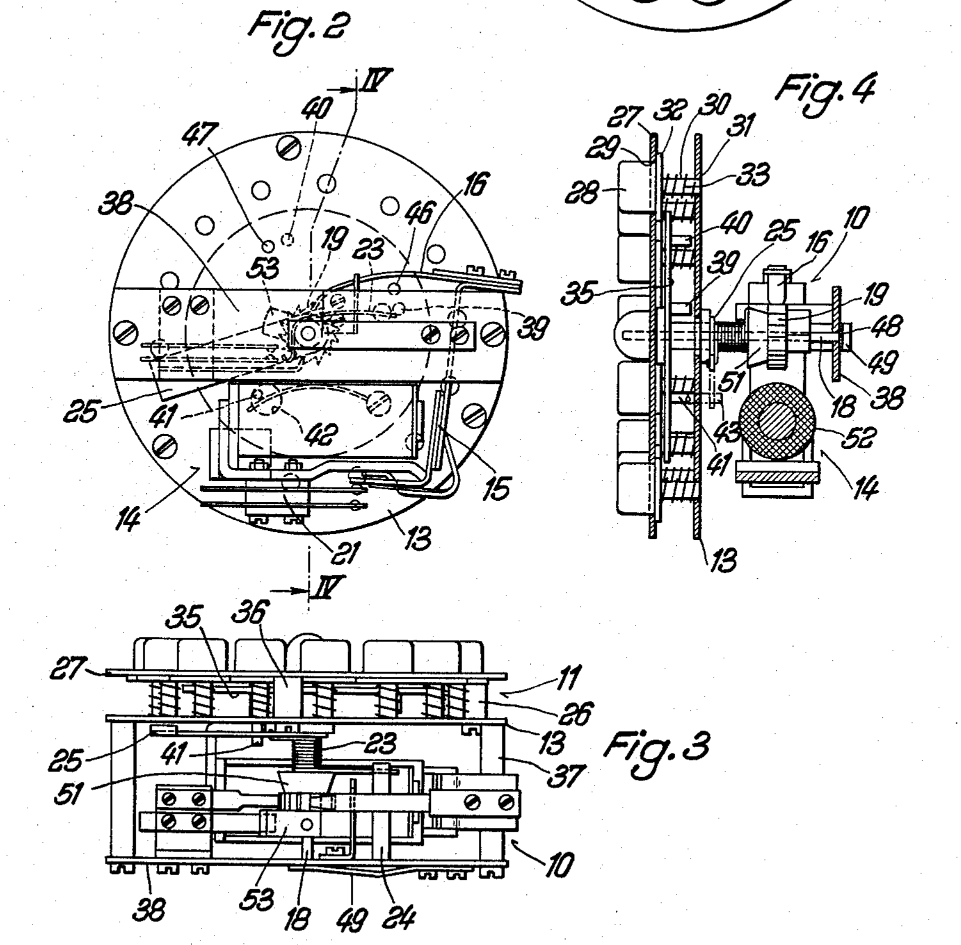
Figure 2 is a back view of the device.
Figure 3 is a plan view of the device.
Figure 4 is a longitudinal section through the device along the broken section line IV—IV in Figure 2.
Figure 6:
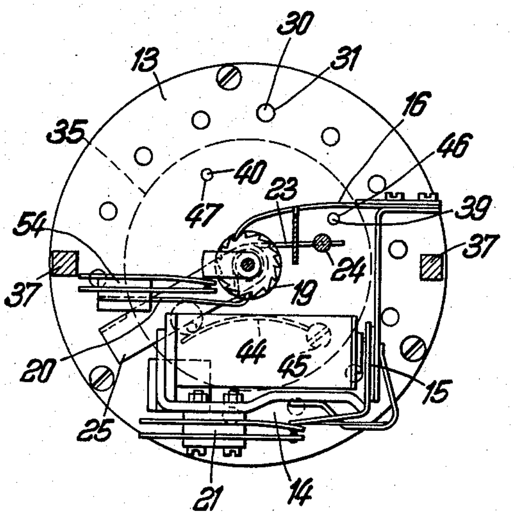
Figure 6 is a back view of the device similar to Figure 2 but after the rear bearing bridge has been removed, and the operating position is slightly different.
Figure 7:
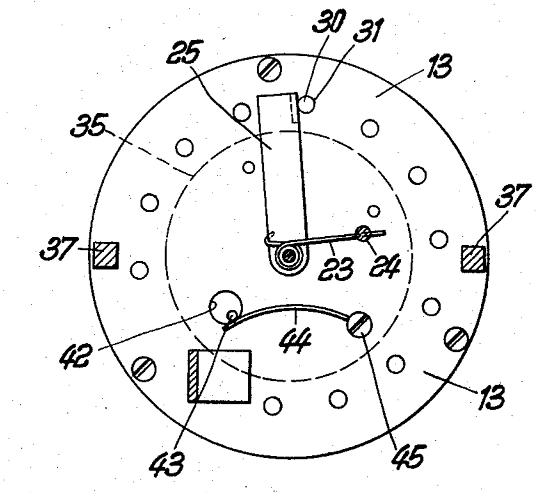
Figure 7 is a back view of the device, after removal of the entire stepping mechanism.

The device, which is intended for mounting in a telephone instrument, instead of the known type of dialling disc, comprises the stepping mechanism 10 and the selector 11, which are both fixed to the same base plate 13. The stepping mechanism 10 comprises a relay 14, which operates a pivotally movable armature 15. A spring-loaded push-pawl 16 is fixed to the pivotally movable armature and engages with a ratchet wheel 19 supported on a central shaft 18, so that it can rotate and slide on the shaft 18, and the ratchet wheel 19 is moved in the anti-clockwise direction by one tooth space when the armature 15 is attracted, as shown in Figure 2. A fixed spring-loaded pawl 20 engages also with the ratchet wheel 19; its task is to retain the ratchet wheel 19 when the push pawl moves back. A contact unit 21 is connected to the relay 14 and the contacts of said unit are closed by means of an arm fixed to the armature 15, as shown in Figure 6, whenever the armature 15 is attracted. A sleeve 22 supported on the shaft 18 is fixed to the ratchet wheel 19, as shown in Figure 6, and a helical spring 23 is wound on the sleeve, one end of the spring being clamped in a fixed retaining block 24, and the other end pushing against a flat lever 25 fixed to the sleeve 22, so that the flat lever constantly tends to rotate in the clockwise direction about the shaft 18, as shown in Figures 2 and 7. The outer end of the lever 25, which is the setting member, moves on a circular path in the immediate neighbourhood of the base plate 15 of the equipment, when the said lever swivels about the shaft 18.

On the other side, a cover plate 27 is fixed with distance pieces 26 to the base plate 13; the cover plate 27 is of exactly the same size as the base plate 13. A series of axially displaceable push-buttons 28 is arranged in the cover plate 27; the push-buttons 28 have cylindrical heads guided in holes 29 of the cover plate 27, and are equipped with pins 30 guided in the holes 31 of the base plate 13.

Collars 32 prevent the push-buttons 28 from dropping out of their guides, a respective helical spring 33 pushes each push-button outward, until the collar 32 makes contact with the back of the cover plate 27.

Twelve push-buttons 28 are shown on the cover plate 27, and marked, for instance, with the numerals from 1 to 12. But it is also possible to provide only ten push-buttons, corresponding to the usual dialling plates of telephone instruments, which have only ten holes.

A blocking member, in the form of a plate 35 fixed to the shaft 18, is provided between the base plate 13 and the cover plate 27. The shaft 18 is supported on both sides of the plate 35, on one side in the central hole 34 of the cover plate 27, and on the other side in the bridge 38 fixed on supports 37 to the base plate 13. On its side facing the base plate 13, the plate 35 supports three pins 39, 40 and 41 spaced at some distance from each other. The pins 39 and 40 are just long enough to ensure that they almost touch the base plate 13 in the rest position of the plate 35. But the pin 41 passes with substantial clearance through a hole 42 of the base plate 13, so far that the end 43 of this pin protruding at the rear of the base plate 13 always projects into the path of the lever 25 fixed to the ratchet wheel 19 and the sleeve 22. The plate 35 can rotate, together with the shaft 18, through an angle determined by the clearance of the pin 41 in the hole 42, if the lever 25 is pushed by the indexing mechanism 10 against the end 43 of the pin 41. This limited rotary motion takes place against the action of the leaf-spring 44 fixed to the base plate 13 by means of a screw 45 and tending to push the plate 35 into its rest position shown in Figure 2; in this position the pin 41 is pushed by the spring 44 against the upper edge of the hole 42.

Figure 5:
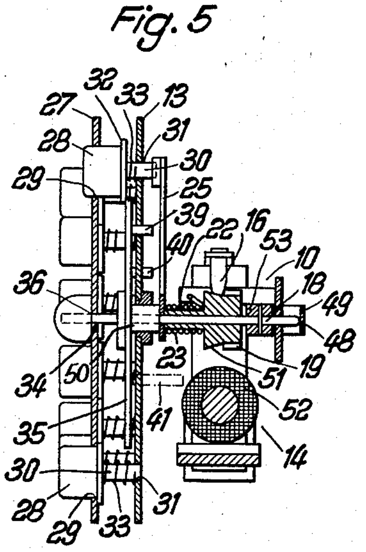
Fig. 5 is a longitudinal section similar to Fig. 4, but showing a different operating position.

In this rest position of the plate 35, axial motion of the said disk is checked by the pins 39 and 40, which make contact with the base plate 13 after they have moved only through a short distance. But in the angularly displaced position of the plate 35 shown in Figures 5 and 6, in which the pin 41 is pushed, against the action of the spring 44, into contact with the lower edge of the hole 42, the pins 39 and 40 of the plate 35 are each exactly opposite holes 46 and 47 in the base plate 13. In this position of the plate 35 it is therefore possible to displace the disk in an axial direction towards the base plate 13; the pins 39 and 40 then pass through the holes 46 and 47. During this axial displacement of the plate 35, fixed to the shaft 18, the end 48 of the shaft 18 pushes against the returning leaf spring 49, screwed to the bridge 38, and bends the leaf spring.

As can be seen clearly in Figure 6, the axial displacement of the plate 35 can be effected by any one of the push-buttons 28, since each of these push-buttons pushes with its collar 32 against the edge of the plate 35, when the head of the push-button is pushed down by the pressure of a human finger. This compresses the helical spring 33, and the pin 30 is pushed through the guide hole 31 in the base plate 13 so far as to project into the path of the lever 25. At the same time the shoulder 50 of the plate 35, fixed to the shaft 18, pushes against the hub of the lever 25, fixed to the sleeve 22, and pushes the sleeve 22 and the ratchet wheel 19 away from the base plate 13. In this sliding motion of the ratchet wheel 19 the push pawl 16 and the retaining pawl 20 retaining the ratchet wheel 19 are disengaged from said wheel and both pawls run against the smooth tapered shoulder 51 of the ratchet wheel 19, so that the lever 25 previously locked in its initial angular position is now released.

At the moment when the two pawls are disengaged from the teeth of the ratchet wheel 19, the lever 25 is moved quickly by the force of the spring 23 from the position shown in Figure 6 in the clockwise direction into the position shown in Figure 7, in which it makes contact with the pin 30 of the push button 28 which has just been actuated; said pin projects through the base plate 13. When the pressure against the push-button is released, the returning spring 49 pushes the shaft 18 and the plate 35 back into their initial axial positions. At the same time also the straight part of the spring 23 returns the ratchet wheel 19 and the sleeve 22 with the lever 25 into their initial axial positions.

While these parts are being returned, the push pawl 16 and the retaining pawl 20 engage again with the teeth of the ratchet wheel 19, so that they retain the lever 25 in the position which it has reached, as shown in Figure 7. The pins 39 and 40 then withdraw from the holes 46 and 47 of the base plate 13, when the push button 28 is released, after which the plate 35, which is now released by said withdrawal, is rotated, by the spring 44 acting in the pin 41, so far that the pins 39 and 40 are no longer in front of the holes 46 and 47. During the processes that now follow, it is therefore impossible to actuate any push button 28, since the position of the plate 35 prevents any of these push-buttons from being pushed in.

Prior to the processes described above, the winding 52 of the relay 14 had been energised by lifting the hand set from the cradle of the telephone instrument, and the plate 35 had been moved by the armature 15 through the push-pawl 16, the ratchet wheel 19, the lever 25 and the pin 41 into the position shown in Figure 6, in which the pins 39 and 40 were standing in front of the holes 46 and 47. At the same time, a pressure piece 53 fixed to the shaft 18, was swivelled in the same direction as the plate 35 and actuated the contact unit 54. This contact unit 54, which is shown in the drawing only as simple normally open contact, contains actually also a break contact, which is connected between a known kind of time base, in the supply line to the winding 52 of the relay 14, and the winding 52. When the release of the push-button 28 permits the plate 35 and the pressure piece 53 to return to the position shown in Figure 2, this break contact is closed, so that now the time base transmits a periodic sequence of current pulses to the winding 52 of the relay 14.

The sequence of these current pulses is determined by the design of the time base, which is composed of resistances and condensers, in a manner known per se. During each current pulse passing through the winding 52 of the relay 14, the armature 15 is attracted, and operates in the push-pawl 16. With each motion the push-pawl 16 rotates the ratchet wheel 19 by one tooth. The ratchet wheel 19 takes the lever 25 with it. When the push-pawl 16 returns, the retaining pawl 20 retains the ratchet wheel 19 in the position reached by said wheel. The operating path of the push-pawl 16 and the spacing of the teeth of the ratchet wheel 19 are arranged so that during each attraction of the armature 15 the lever 25 is moved through an angle corresponding to the interval between two adjacent push-buttons 28, so that the lever 25 is swivelled during each current pulse, as shown in Figure 7, from one hole 31 to the next hole in the anti-clockwise direction.

Starting with the position shown in Figure 7, to which the lever 25 has moved after the fifth push-button has been pressed, only four steps of the indexing mechanism 10 are required therefore to return the lever 25 to its position shown in Figure 2, from which it is immediately rotated, by a further switching step, into the position shown in Figure 6 and thereby moves the plate 35 into the position unlocking the push-buttons 28, and the pressure piece 53 closes the circuit of the winding 52 of the relay and keeps this circuit continuously closed until a button 28 is again pressed.

With this return of the lever, the spring 23 is again stressed, so that the spring is ready to swivel the lever 25 clockwise against the stop corresponding to any push-button 28, which may subsequently be pressed.

From the above description of the method of operation of the equipment it is apparent that in every case as many current pulses can be obtained through the set of contacts 21 of the relay 14, operated by the armature 15, as there are steps in the motion of the lever 25 returning to the position shown in Figure 6 from a position as shown in Figure 7, into which it moves when possible, by a suitable choice of the push-button to be actuated, to send out only one or up to twelve current pulses consecutively. After one such series of current pulses has been completed, the subsequent actuation of another push-button will end out a second series of pulses, the number of pulses in the series being again selected at will be the operator.

The substantial advantage of the new device, which is intended to replace the selector dials now in use in telephone instruments, consists in the fact that in every case the light pressure against a push-button, which does not fatigue the fingers, is sufficient to send out a series of pulses.

There is no danger of wrong connections, because, as already mentioned above, when the finger moving the push-button into its releasing position is withdrawn, the plate 35 returns to the position shown in Figure 2 and prevents the actuation of further push-buttons, prevents the operation of further push-buttons until the desired series of pulses has been sent out.

It is presumably also clear that the invention, which was explained in detail by means of the embodiment shown in the drawing can be applied not only to instruments with devices similar to selector dials, but also to many other instruments intended for the transmission of current pulses. Thus, for instance, it is not necessary to arrange the push-buttons 28 along a circle, and make the lever 25 swivel about a shaft. Instead of the lever 25, a component moving along a straight line can be designed, so that it performs the same functions as the lever 25 in the embodiment shown here; in that case, for instance, the push-buttons 28 can be arranged along a straight line.

I claim:

1. A device for transmitting electrical pulses, comprising a setting member, energy accumulating means adapted to move said member from an initial position into a setting position, means for arbitrarily determining said setting position and thereby limiting the distance through which said accumulating means move said member, a power driven mechanism adapted thereafter to move said member back from said setting position into its initial position, in a series of equal steps of fixed magnitude, against the action of said energy accumulating means and thereby to charge said accumulating means, and a contact adapted to be closed at each step and thereby to cause an electrical pulse to be transmitted.

2. A device as claimed in claim 1, comprising a plurality of stops arranged consecutively along the path traversed by the setting member when moved by the accumulating means, each stop being adapted to be moved manually out of an inoperative position, in which it allows said member to pass, into an operative position in which it arrests the movement of said member.

3. A device as claimed in claim 2, in which the power-driven mechanism is an electro magnetically actuated ratchet mechanism, comprising a push pawl and electrically controlled electro magnet adapted to actuate the push pawl in steps, a ratchet wheel rigid with the setting member and adapted to be actuated in one direction by the push pawl, and a retaining pawl adapted to secure the ratchet wheel against rotation in the other direction.

4. A device as claimed in claim 3 comprising a blocking means adapted to prevent movement of any of the stops and to be released by movement of the setting member into its initial position, and a member adapted to co-operate with said means and to be moved by any one of the stops and to move the ratchet wheel axially so as to disengage it from the push pawl and the retaining pawl.

5. A device as claimed in claim 4, comprising a setting member in the form of a lever, a shaft rotatably supporting said lever, a round disc, stops formed as push buttons arranged in said disc on a circular arc and at equal distances from said shaft, pins on said push buttons, a base plate formed as a disc apertured to permit said pins to pass through it, and a spring adapted to hold each button in an inoperative position.

6. A device for transmitting electrical pulses, comprising a setting member, energy accumulating means adapted to move said member from an initial position into a setting position, a plurality of stops arranged consecutively along the path traversed by the setting member when moved by the accumulating means, each stop being adapted to be moved manually out of an inoperative position, in which it allows said member to pass, into an operative position in which it arrests the movement of said member, a power driven mechanism adapted to move said member back from said setting position into its initial position, in a series of equal steps of fixed magnitude, against the action of said energy accumulating means and thereby to charge said accumulating means, and a contact adapted to be closed at each step and thereby to cause an electrical pulse to be transmitted.

7. A device for transmitting electrical pulses, comprising a setting member, energy accumulating means adapted to move said member from an initial position into a setting position, a plurality of stops arranged consecutively along the path traversed by the setting member when moved by the accumulating means, each stop being adapted to be moved manually out of an inoperative position, in which it allows said member to pass, into an operative position in which it arrests the movement of said member, locking means adapted to retain the setting member in its initial position and to be released when any one of the stops is moved into its operative position, a power driven mechanism adapted to move said member back from said setting position into its initial position, in a series of equal steps of fixed magnitude, against the action of said energy accumulating means and thereby to charge said accumulating means, and a contact adapted to be closed at each step and thereby to cause an electrical pulse to be transmitted.

8. A device for transmitting electrical pulses, comprising a setting member, energy accumulating means adapted to move said member from an initial position into a setting position, a plurality of stops arranged consecutively along the path traversed by the setting member when moved by the accumulating means, each stop being adapted to be moved manually out of an inoperative position, in which it allows said member to pass, into an operative position in which it arrests the movement of said member, a power driven mechanism adapted to move said member back from said setting position into its initial position, in a series of equal steps of fixed magnitude, against the action of said energy accumulating means and thereby to charge said accumulating means, a contact adapted to be closed at each step and thereby to cause an electrical pulse to be transmitted, and blocking means adapted to prevent movement of any of the stops when the setting member is out of its initial position.

9. A device for transmitting electrical pulses, comprising a setting member, energy accumulating means adapted to move said member from an initial position into a setting position, a plurality of stops arranged consecutively along the path traversed by the setting member when moved by the accumulating means, each stop being adapted to be moved manually out of an inoperative position, in which it allows said member to pass, into an operative position in which it arrests the movement of said member, locking means adapted to retain the setting member in its initial position and to be released when any one of the stops is moved into its operative position, a power driven mechanism adapted to move said member back from said setting position into its initial position, in a series of equal steps of fixed magnitude, against the action of said energy accumulating means and thereby to charge said accumulating means, a contact adapted to be closed at each step and thereby to cause an electrical pulse to be transmitted, blocking means adapted to prevent movement of any of the stops when the setting member is out of its initial position, and a member adapted to co-operate with the blocking means and to be moved by actuation of any one of the stops and to release the locking means.

References Cited in the file of this patent

UNITED STATES PATENTS

| | | |
|---|---|---|
| 2,089,768 | Stevenson | Aug. 10, 1937 |
| 2,246,697 | Richard | June 24, 1941 |
| 2,246,698 | Roberts et al. | June 24, 1941 |
| 2,273,550 | Zapf | Feb. 17, 1942 |
| 2,388,358 | Hubbard | Nov. 6, 1945 |
| 2,394,926 | Mallina | Feb. 12, 1946 |